US006708833B2

(12) United States Patent
Kolb

(10) Patent No.: US 6,708,833 B2
(45) Date of Patent: Mar. 23, 2004

(54) INFANT NIPPLE ATTACHMENT

(76) Inventor: Kenneth W. Kolb, 7-2 Jalan Sri Kotal, Sungai Chua, Kajang, Selangor Darul Ehsan (MY)

( * ) Notice: Subject to any disclaimer, the term of this patent is extended or adjusted under 35 U.S.C. 154(b) by 39 days.

(21) Appl. No.: 10/034,420

(22) Filed: Dec. 27, 2001

(65) Prior Publication Data

US 2003/0071006 A1 Apr. 17, 2003

Related U.S. Application Data

(60) Provisional application No. 60/329,169, filed on Oct. 12, 2001.

(51) Int. Cl.[7] .............................. A61J 9/00; A61J 11/02; A61J 11/04
(52) U.S. Cl. ..................... 215/11.1; 215/11.5; 215/11.6; 426/117
(58) Field of Search .............................. 215/11.1, 11.5, 215/11.6; 426/117

(56) References Cited

U.S. PATENT DOCUMENTS

| 730,337 | A | | 6/1903 | Bonnefont | |
|---|---|---|---|---|---|
| 2,519,986 | A | | 8/1950 | Trout et al. ................... | 215/11 |
| 2,531,570 | A | * | 11/1950 | Hoffman ..................... | 215/11.1 |
| 2,628,906 | A | | 2/1953 | Horan ......................... | 99/171 |
| 2,628,909 | A | | 2/1953 | Horan ......................... | 99/171 |
| 2,956,702 | A | | 10/1960 | Ransom ....................... | 215/11 |
| 3,117,874 | A | * | 1/1964 | Horan ......................... | 215/11.1 |
| 3,394,018 | A | * | 7/1968 | Velonis et al. ............... | 215/11.1 |
| 3,804,952 | A | * | 4/1974 | MacDonald ................. | 215/11.1 |
| 3,966,869 | A | * | 6/1976 | Kohl ........................... | 215/11.1 |
| 4,600,111 | A | | 7/1986 | Brown .......................... | 215/6 |
| 5,461,867 | A | | 10/1995 | Scudder et al. .................. | 62/4 |
| 5,626,022 | A | | 5/1997 | Scudder et al. .................. | 62/4 |
| 6,079,405 | A | | 6/2000 | Justo ...................... | 126/263.08 |
| 6,123,065 | A | | 9/2000 | Teglbjarg ................ | 126/263.09 |
| 6,138,847 | A | | 10/2000 | Johnson ...................... | 215/11.1 |
| 6,171,623 | B1 | | 1/2001 | Gaylor et al. ................ | 426/117 |
| 6,234,165 | B1 | | 5/2001 | Creighton et al. ........ | 126/263.06 |

FOREIGN PATENT DOCUMENTS

| GB | 2164860 A | * | 4/1986 |
|---|---|---|---|
| JP | 6298257 A | * | 10/1994 |
| JP | 11278481 A | * | 10/1999 |

* cited by examiner

*Primary Examiner*—Sue A. Weaver
(74) *Attorney, Agent, or Firm*—Jones, Walker, Waechter, Poitevent, Carrere & Denegre, LLP

(57) ABSTRACT

A container for nursing infants, the container including an interior with a first end (or top end) opening into the interior. A flexible nipple attaches across the opening and is positioned such that at least a portion of the nipple extends into the interior of the container. A container lid is then positioned over the flexible nipple and encloses the interior of the container. Also, the present invention includes a second end (or bottom end) with internal walls extending upwards toward the top end and thereby forming an internal cavity in the container. A thermic module is then positioned in this internal cavity.

12 Claims, 11 Drawing Sheets

INFANT NIPPLE ATTACHMENT

This application claims priority to U.S. Provisional Application Serial No. 60/329,169, filed on Oct. 12, 2001, which is incorporated by reference herein in its entirety.

BACKGROUND OF INVENTION

The present invention relates to a container with nipple attachment for feeding infants. In particular, the present invention relates to a container which heats the food within the container and allows the nipple attachment to be enclosed within the container.

There are a significant number of prior art references relating containers with nipple attachments thereon for allowing infants and juvenile children to suckle a food item from the container. As used herein, a nipple attachment for a "juvenile" differs from that for an infant only in that the juvenile nipple attachment has a larger aperture to allow for a larger flow of fluid. Also as used herein, the term's food item, container contents, liquid, or beverage are considered equivalent and may be used interchangeably. Many prior art containers with nipple attachments may be considered "baby bottles" which have a size and shape considerably different from beverage containers used by older children and adults. Typically, a beverage to be consumed by an infant must be transferred from the original beverage container into the baby bottle. This procedure is time consuming and is prone to spills and other problems which require subsequent cleanup activities. It would be desirable to provide an economical container which has an integral nipple attachment and the beverage already stored in the container. It would also be desirable for the container to be a standard size, such as the size of the common twelve ounce cylindrical soda can (approximately 12 cm in height and 6.5 cm in diameter), so that existing canning equipment could process such containers.

Another desirable aspect of a beverage container for an infant would be a means of warming the beverage to approximately 21 to 43° C., however in some applications, the temperature may be higher such as to approximately 55° C. There exist many self-contained heating modules for beverage containers, for example U.S. Pat. Nos. 5,461,867 and 5,626,022, both to Scudder. There even exist attempts to incorporate self-heating modules for use in conjunction with baby bottles, for example U.S. Pat. No. 6,123,065 to Teglbjarg and U.S. Pat. No. 6,234,165 to Creighton. However, Teglbjarg actually stores the nipple in a separate compartment in the bottom of the container and requires the user to fix the nipple to the upper opening in the beverage container. Creighton provides a bottle with a nipple already attached, but actually incloses the bottle in a separate heating container. Both Teglbjarg and Creighton require oversized containers which would be far more expensive to manufacture than a standard sized soda can.

It is apparent that neither Teglbjarg nor Creighton, nor any other prior art device has provided a beverage container with an integral nipple attachment which may be assembled using far more cost effective modem canning manufacturing and sterilization methods. There are many problems in prior art baby bottles, which if overcome, would provide a much more commercially viable product. For example, the baby bottles should provide a manner of pre-attaching the nipple to the container while allowing the nipple, container and its contents to be enclosed and sized such that the container may be stored at room temperature for long periods of time. The aperture in the nipple should be sealed to prevent the beverage from oozing out of the nipple and forming an unsightly and messy film about the nipple. Nevertheless, the aperture in the end of nipple should be easily openable.

It is therefore an object of the present invention to provide a container with a nipple attachment which may be manufactured using standard canning methods.

It is an object for the nipple attachment to be pre-attached and removably enclosed within the beverage container.

It is an object to allow the nipple attachment to be sterilized at the same time the beverage in the container is sterilized.

It is an object to allow the nipple attachment to remain clean and sterile after canning.

It is an object to allow the container to be easily opened and the nipple positioned for use with a minimum of effort.

Finally, it is an object to provide a thermic module allowing the container to be self-heating or self-cooling.

SUMMARY OF INVENTION

The present invention provides a container for nursing infants. The container includes an interior with a first end (or top end) opening into the interior. A flexible nipple attaches across the opening and is positioned such that at least a portion of the nipple extends into said interior of the container. A container lid is then positioned over the flexible nipple and encloses the interior of the container.

In addition, the present invention includes a second end (or bottom end) with internal walls extending upwards toward the top end and thereby forming an internal cavity in the container. A thermic module is then positioned in this internal cavity.

DETAILED DESCRIPTION OF INVENTION

Figure 1:
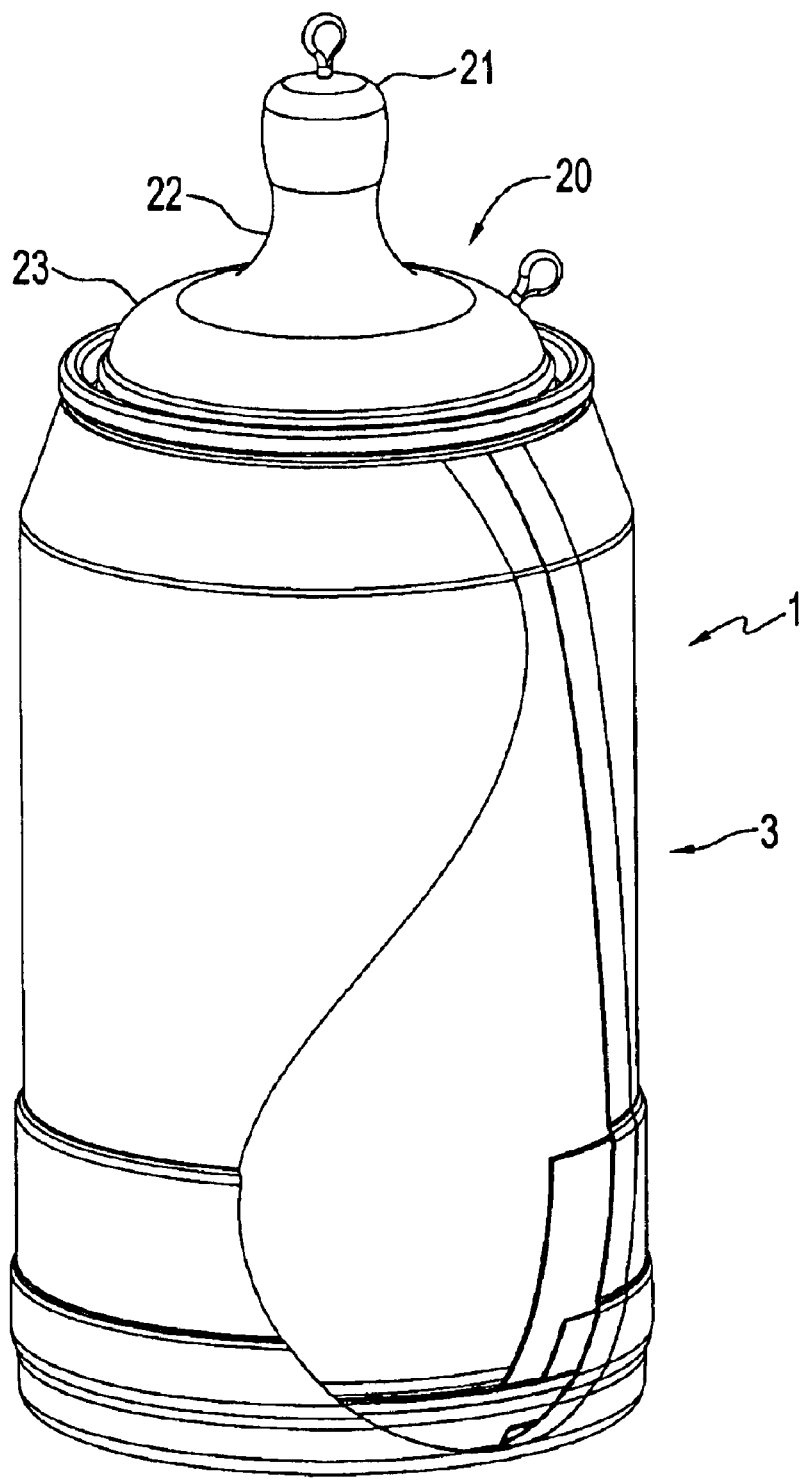
FIG. 1 is a perspective view of the present invention with the nipple attachment extended.
Figure 2:
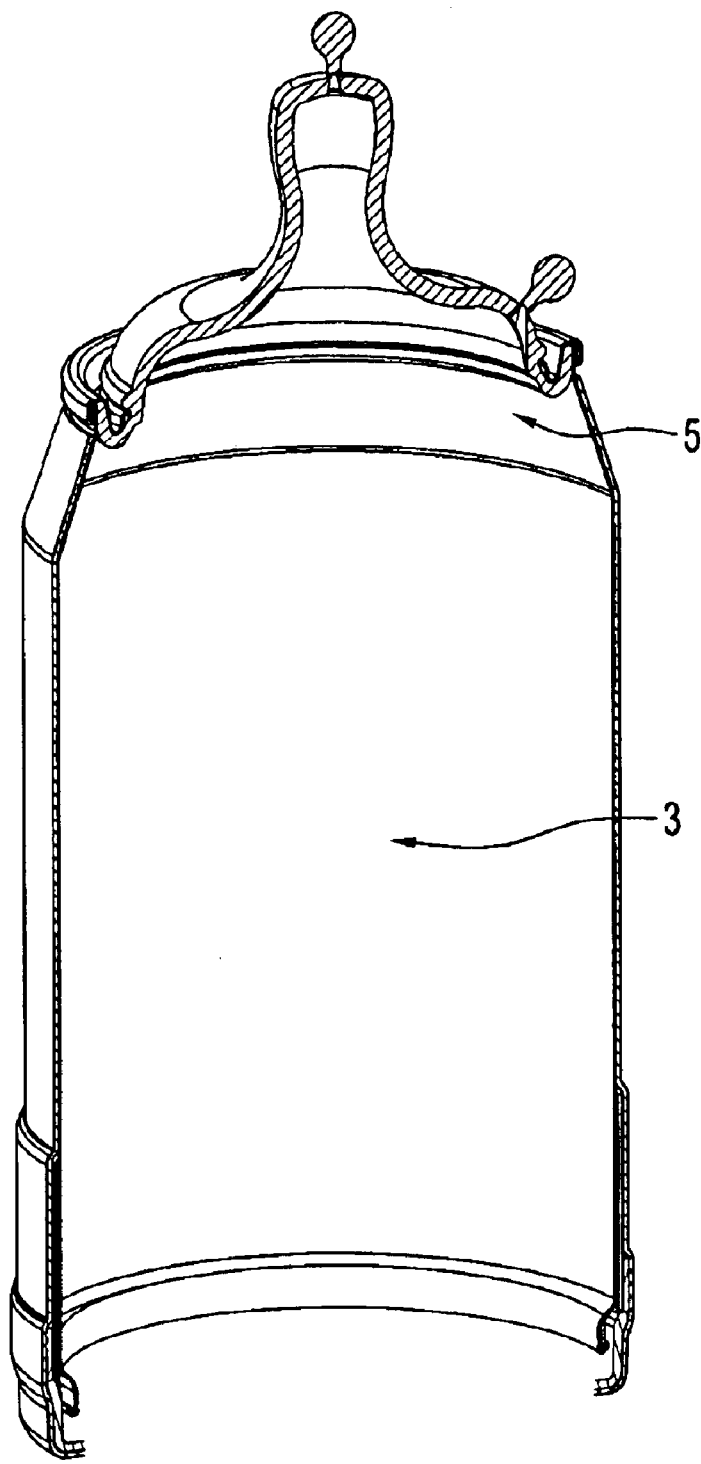
FIG. 2 is a cross-sectional view of FIG. 1.
Figure 3:
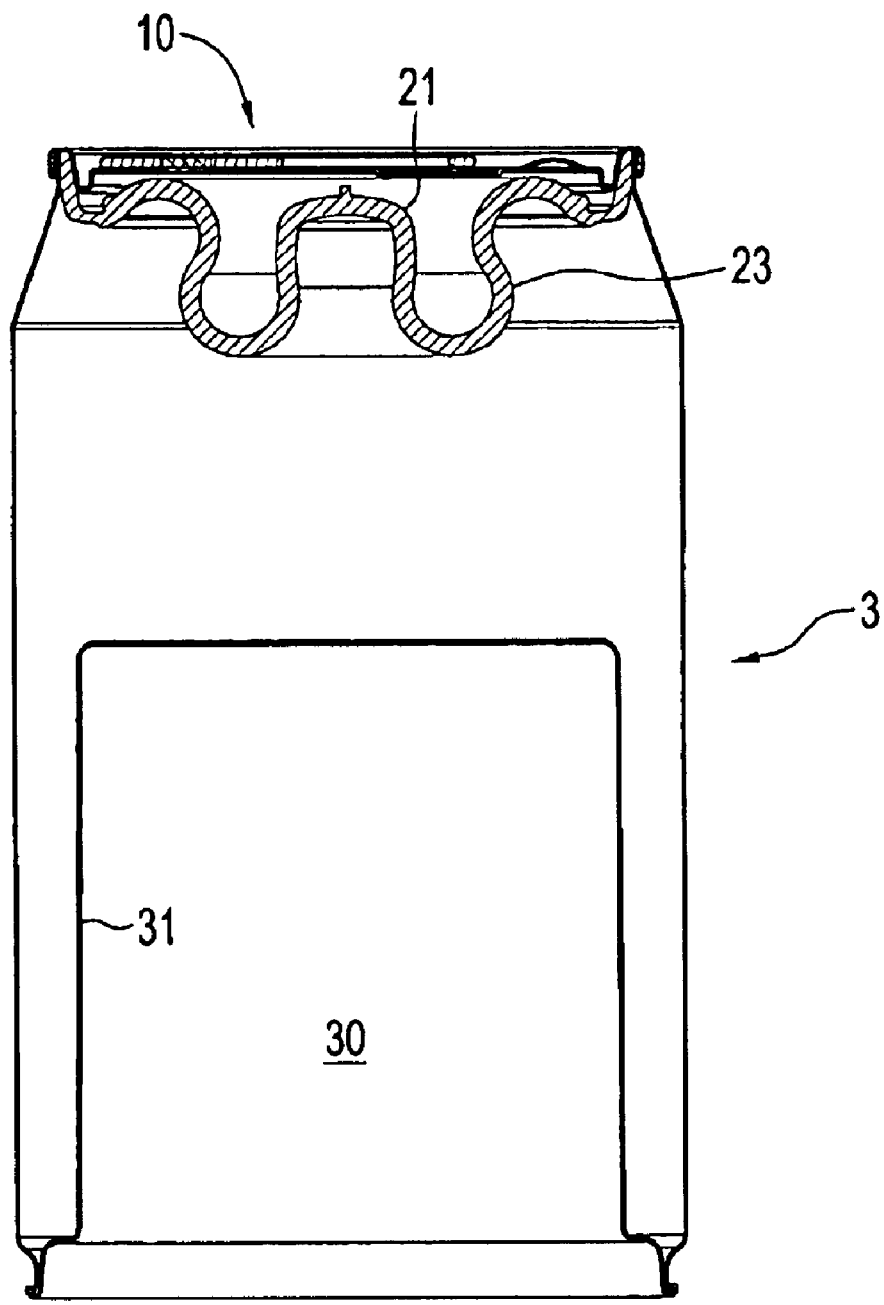
FIG. 3 is a cross-sectional view of the invention without the thermic module and with the nipple attachment folded within the container.
Figure 4:
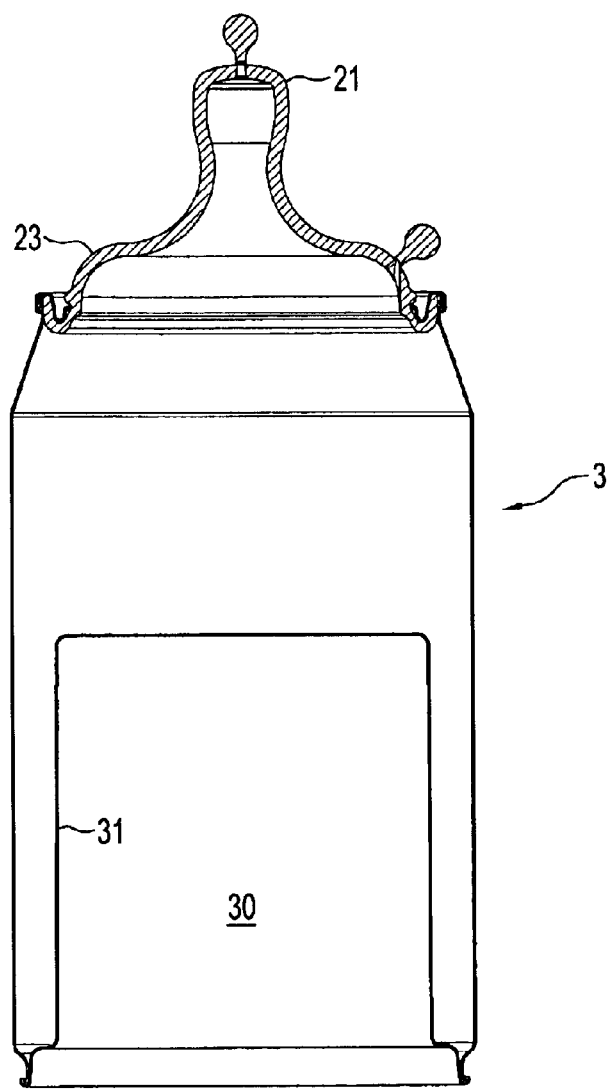
FIG. 4 is a view similar to FIG. 3, but with the nipple attachment extended.

FIG. 1 illustrates the container 1 of the present invention having container body 3 and flexible nipple attachment 20. Flexible nipple attachment 20 will further include nipple head 21, nipple neck 22, and nipple shoulder 23. The cross-sectional view of FIG. 2 illustrates how container 1 will also include container interior 4 and a top opening 5 over which flexible nipple attachment 20 is attached. As best seen in FIGS. 3 and 4, container body 3 will include internal side walls 31 extending upward to form cavity 30 in the bottom portion of container body 3. The purpose of cavity 30 is to house a thermic module for heating or cooling the contents of container 1. Container body 3 may be constructed of any suitable material, with one preferred embodiment being constructed out of a metal such as tin or aluminum or even materials such as plastics by methods well known in the art.

Figure 6:
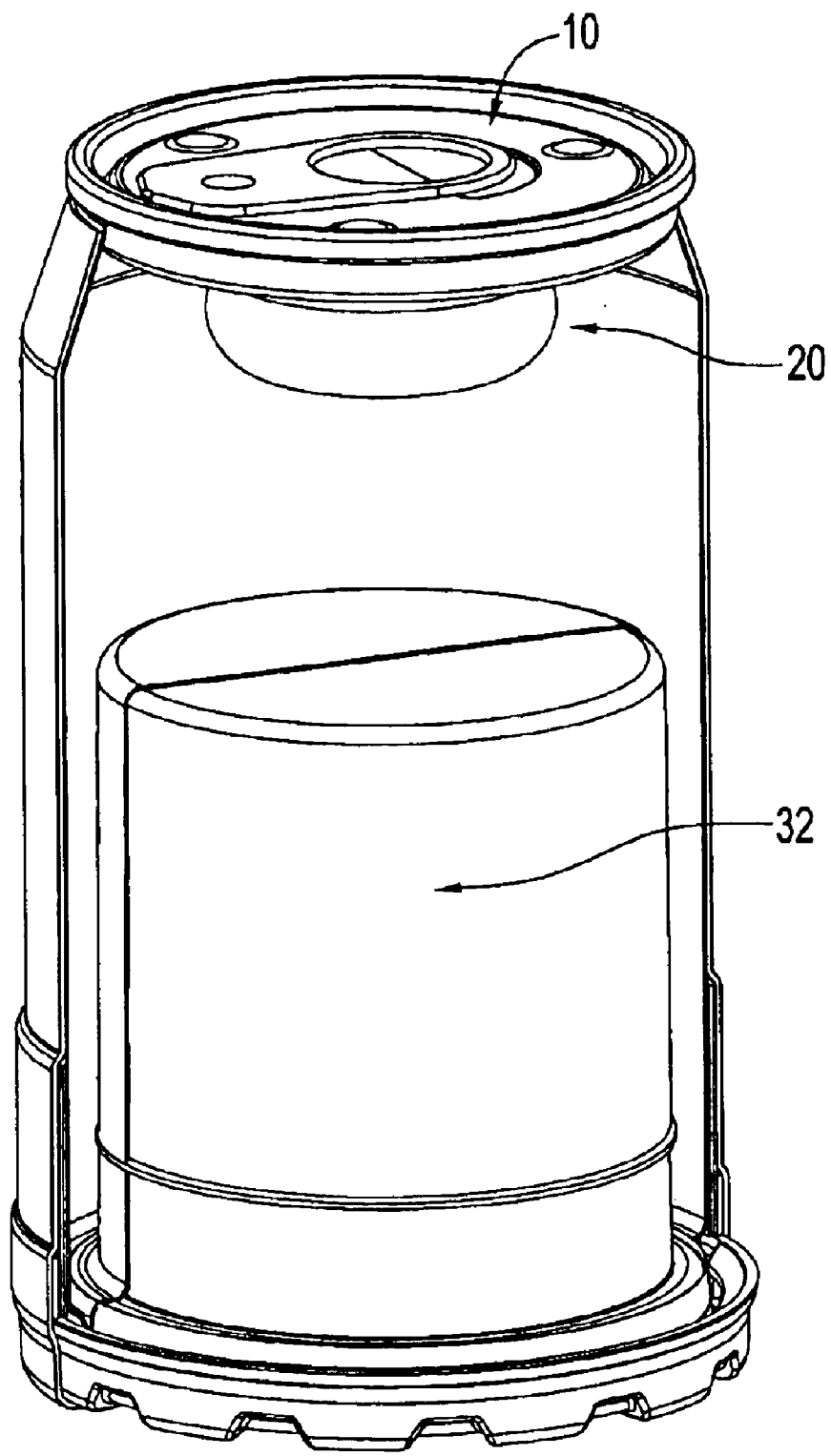
FIG. 6 is a view of the present invention with the container wall cut away and the nipple attachment folded within the container.
Figure 7:
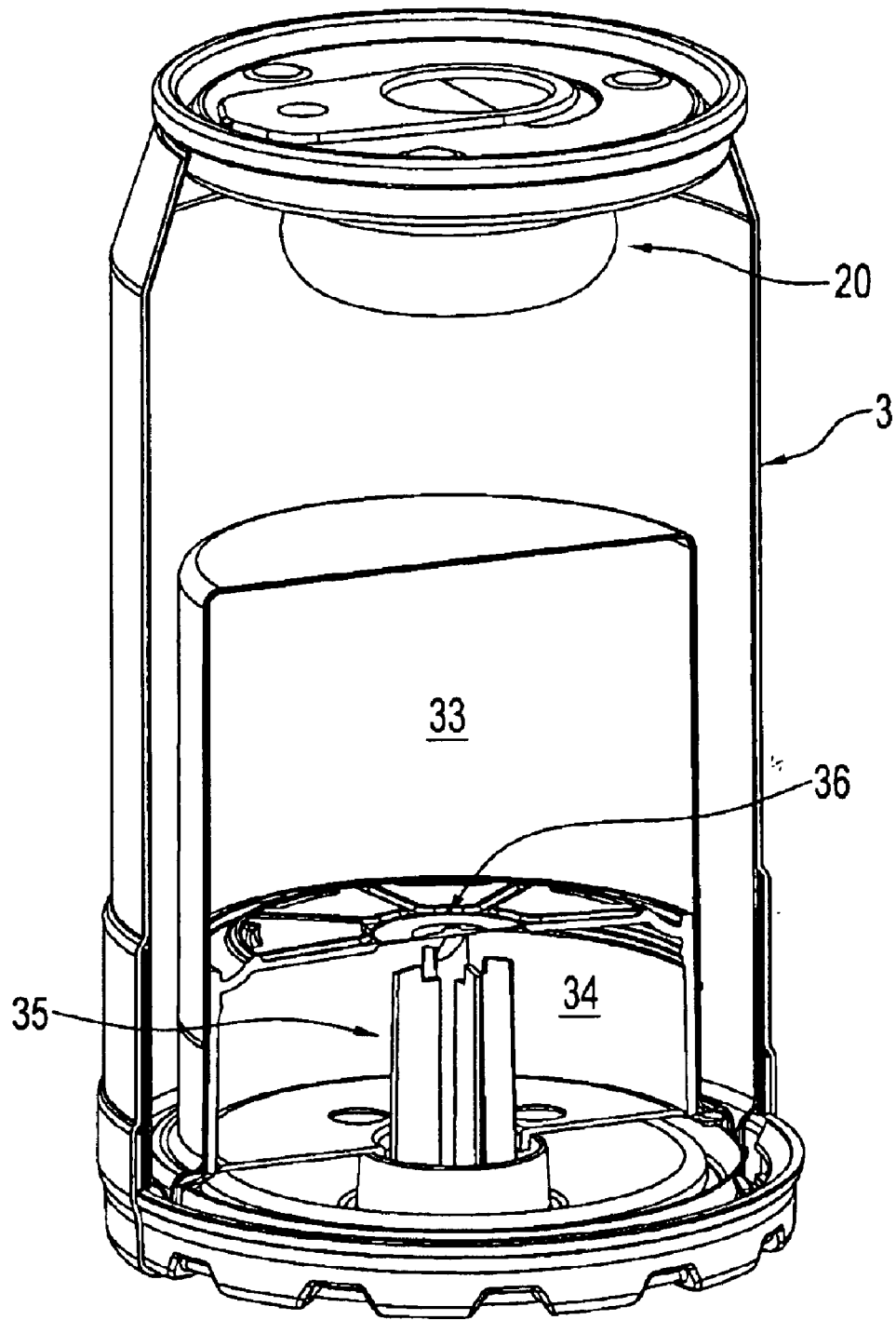
FIG. 7 is a cross-sectional view of a thermic module in the bottom of said container.

In a preferred embodiment seen in FIGS. 6 and 7, the thermic module 32 is a separate cup-like element which is inserted into cavity 30. As shown in FIG. 7, this thermic module 32 includes an upper compartment 33 and a lower compartment 34 separated by a dividing wall 36. Typically, one compartment will contain a first chemical reactant and the other compartment will contain a second chemical reactant. Attached to the flexible base of thermic module 32 will be actuator 35. When the base of module 32 is pressed inward, actuator 35 will perforate dividing wall 36, allowing the chemicals reactants to mix, thereby creating a endothermic or exothermic reaction depending on the chemicals used. A typical combination of reactants used to create an exothermic reaction is quicklime and water. A fuller disclosure of an insertable thermic module suitable for use with the present invention is disclosed in U.S. patent application Ser. No. 10/003,877, filed on Oct. 25, 2001 ("the '877 Application"), which is incorporated by reference herein in its entirety. The '877 Application discloses thermic module which has a lime cup with side walls formed of a thin plastic. Varying the thickness of the side walls affects the amount of heat transferred from the thermic module to the contents of the container. For example, using a water to quicklime ratio disclosed in the '877 Application (27 g water, 74 g quicklime), an approximately 0.25 to 0.45 mm thick polypropylene (PP) side wall will result in an approximately 20° C. increase in the contents of a 210 ml can. On the other hand, the same approximate temperature change may be accomplished using the 0.2 mm PP side wall thickness disclosed in the '877 Application, but now using 20 g of water and 55 g of quicklime. Those skilled in the art will recognize a wide range of water to quicklime ratios (e.g. 0.3 to 0.4 or 0.2 to 0.5) could be employed depending on the thickness of the side wall and the material from which the cup was constructed. All such variations are intended to come within the scope of the present invention.

It may also be desirable to provide a slower exothermic reaction to reduce the amount of steam generated in the thermic module. One manner of accomplishing this is to mix the quicklime with lightly burned Domolite ($CaMg(CO_3)_2$). A suitable range of quicklime to Domolite ratios could be 2.3 to 4 or even 1.5 to 9. The quicklime/Domolite combination may be substituted for quicklime at the water to quicklime ratios recited above.

Figure 16:
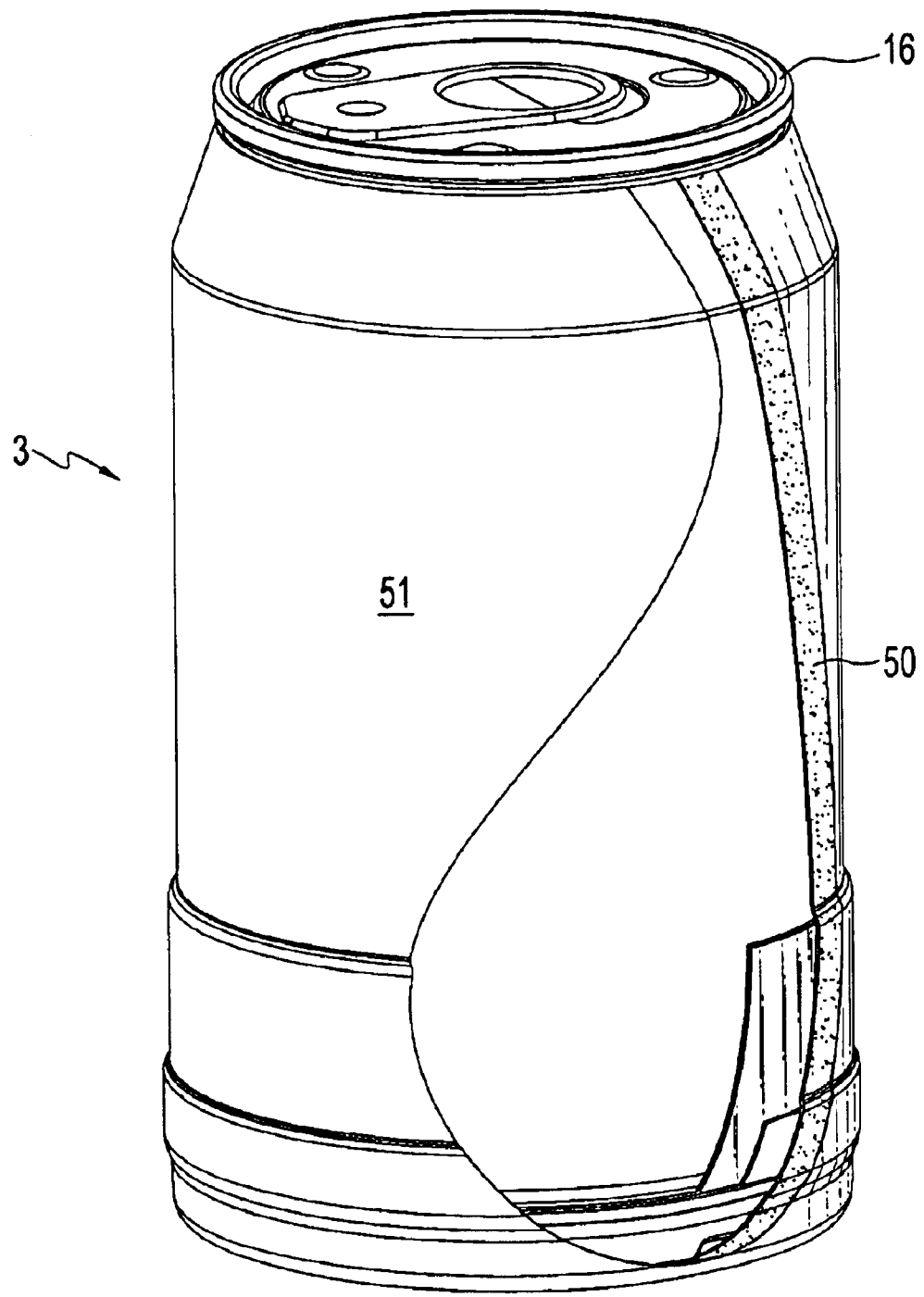
FIG. 16 is a view of the insulating sleeve which will typically cover containers having thermic modules.

In addition to the separately insertable thermic modules such as disclosed in the above referenced application, thermic modules may be integrally formed within the cavity 30 by placing one of the reactants directly in the cavity. U.S. Pat. No. 5,626,022 Scudder, et al., which is incorporated by reference herein in its entirety, discloses one such integrally formed thermic module. The present invention could employ either the separately insertable or integrally formed thermic module. When a thermic insert is employed with container 1, FIG. 16 illustrates how it will be advantageous to position an insulating sleeve 50 along container body 3 with a shrink-wrap cover 51 overlaying insulating sleeve 50. The insulating sleeve 50 may be formed of cotton, wool, corrugated cardboard, or other suitable, insulating, moisture absorbent materials. One suitable type of insulating sleeve is disclosed in U.S. patent application Ser. No. 10/003,877.

Figure 8:
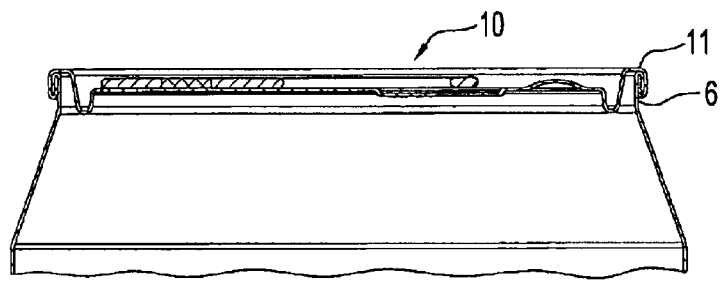
FIG. 8 is a side view of the closing lid of the present invention.
Figure 9:
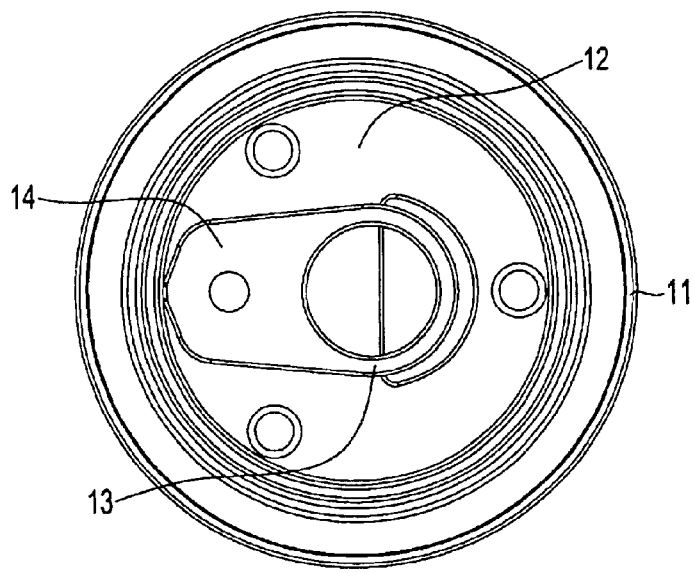
FIG. 9 is a top view of the closing lid.
Figure 15:
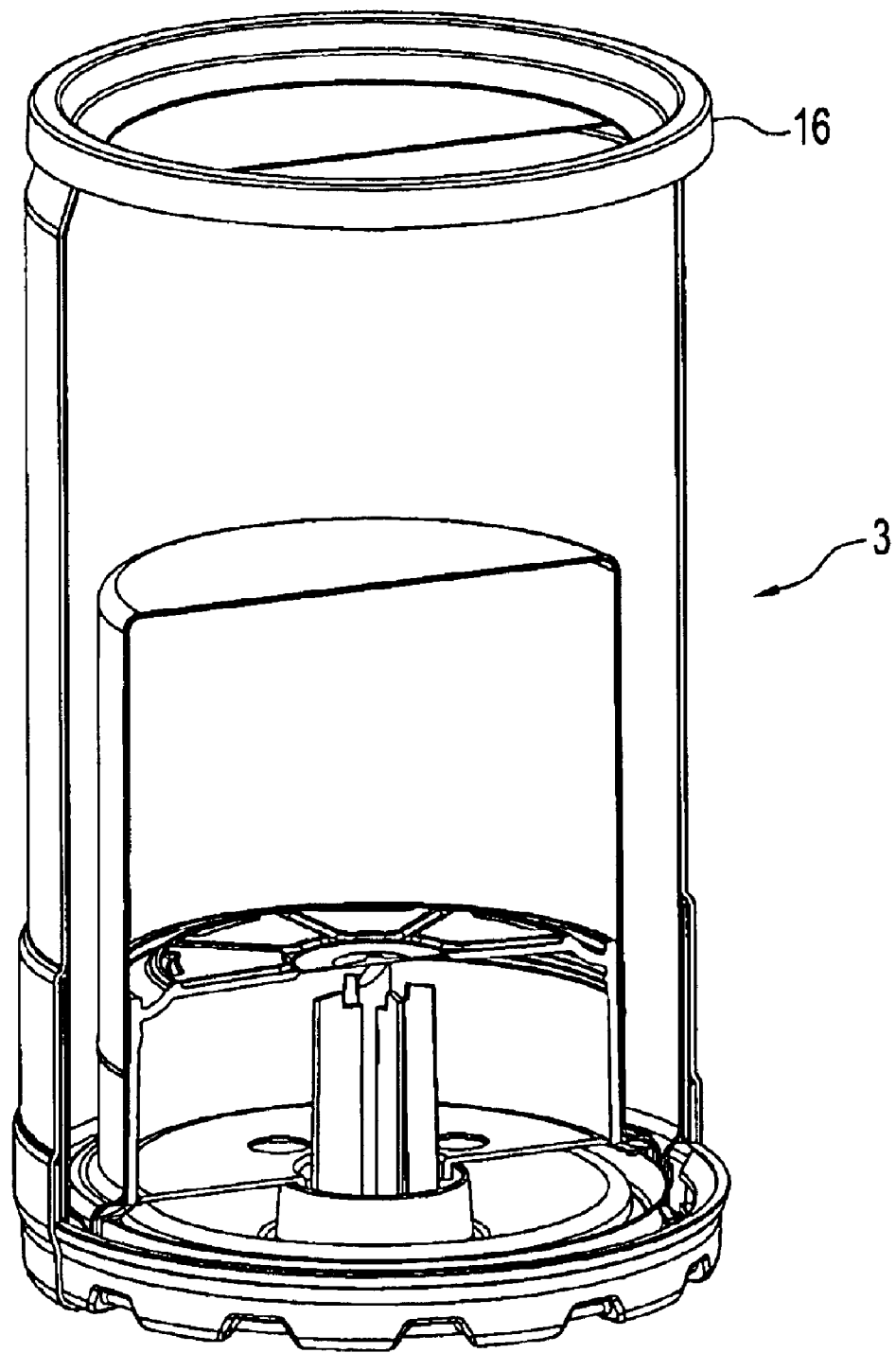
FIG. 15 is a view of the container showing the plastic protective ring over the container rim.

In a preferred embodiment, container 1 will include some type of easy-opening lid. While lid 10 is shown conceptually in FIGS. 6 and 7, FIGS. 8 and 9 better illustrate one easy-opening lid of the preferred type. The conventional lid 10 in FIG. 9 will include lid rim 11, a peel-back top 12, and finger ring 13. As is well known in the art, lip 10 will be opened by first lifting finger ring 13 to cause punch portion 14 to break the seal between peel-back top 12 and lid rim 11, then finger ring 13 will be pulled backwards, pulling peel-back top 12 away from the rest of lid rim 11. FIG. 8 illustrates how lid 10 will be connected to container body 3. Container body 3 will include a container rim 6 at the top of body 3. Lid 10 will be placed over body 3 and then lid rim 11 will be crimped onto container rim 6. When nipple attachment 20 is used in combination with a container 1 having a thermic module, a plastic rim cap or protective ring 16 (see FIG. 15) may be positioned on top of the metal lid rim 11 to ensure that overly warm metal does not come into contact with the infant suckling from contain 1. As with container body 3, lid 10 may be constructed of any suitable material including tin or aluminum (or even plastic).

Figure 5:
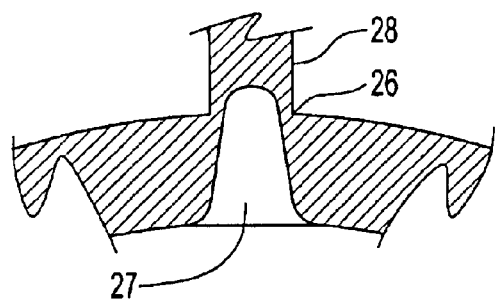
FIG. 5 is a detailed cross-sectional view of the removable plug formed on the nipple attachment.
Figure 11:
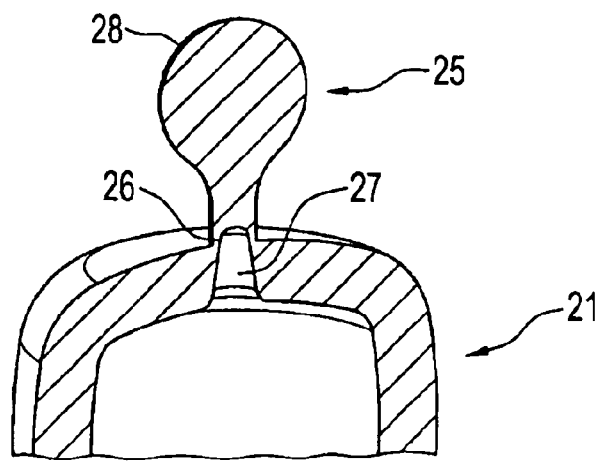
FIG. 11 is a cross-sectional view of the head of the nipple attachment.

As mentioned previously, nipple attachment 20 will include nipple head 21, nipple neck 22, and nipple shoulder 23. Nipple attachment 20 may be formed of any suitable rubber-like material, such as latex, rubberized plastic, or silicone. As best seen in FIG. 11, nipple head 21 will have a nursing aperture 27 formed therein. However, it is generally more hygienic and more aesthetically pleasing to close off nursing aperture 27 prior to use in order to prevent the contents of container 1 from escaping through nursing aperture 27. To this end, a removable plug 25 is formed over nursing aperture 27. In the embodiment seen in FIGS. 5 and 11, removable plug 25 consists of a pull tab 28 integrally formed with attachable nipple 20. Where the lower section of pull tab 28 attaches to nursing aperture 27, a v-shaped cut 26 is produced through nipple head 21 and into the base of removable plug 25 such that only a thin section of material holds plug 25 to nipple head 21. This produces a fault or fatigue point along which plug 25 will break off. When tab 28 is pulled, it readily tears away or twists off and leaves aperture 27 open to fluid flow induced by an infant's suckling. All the features of nipple attachment 20, including v-shaped cuts 26 and pull tabs 28, may be integrally formed by any conventional technique such as pour molding or injection molding of silicon.

Figure 10:
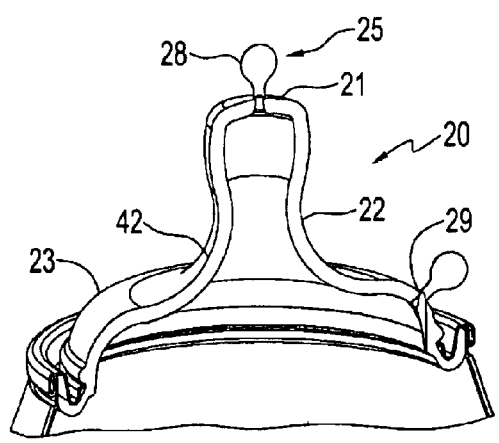
FIG. 10 is a cross-sectional view of the nipple attachment.

As seen in FIG. 10, a second aperture, air aperture 29, is also formed in the shoulder portion 23 of nipple attachment 20. Air aperture 29 is closed with a removable plug 25 in the same manner as nursing aperture 27. The purpose of air aperture 29 is to allow air into container 1 to displace fluid removed through the infant's nursing and prevent a vacuum from forming in container 1. Naturally an air aperture could be positioned anywhere on the container which would allow air to replace the fluid removed.

Figure 12:
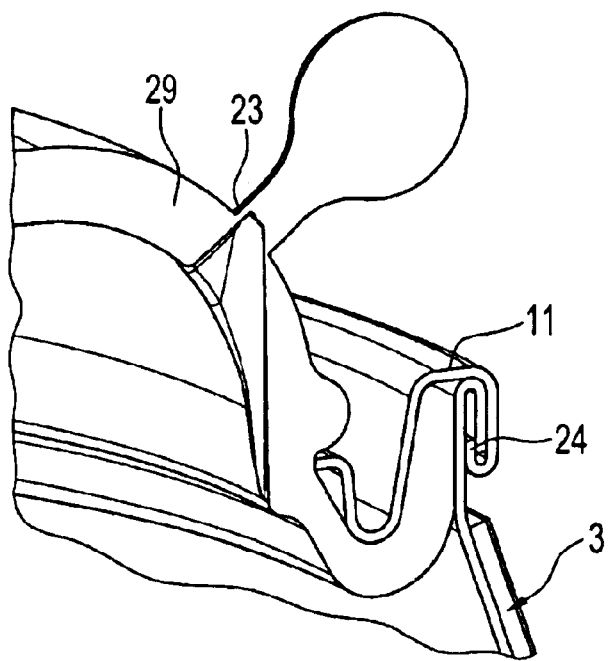
FIG. 12 is a detailed view of the nipple attachment positioned between the container rim and the lid rim.

The manner of connecting nipple attachment 20 to container body 3 is best shown in FIG. 12. Nipple attachment 20 will have an attachment perimeter 24 (see also FIG. 13) which is sufficiently large in diameter to stretch across the container rim 6. Lid rim 11 will then be placed over attachment perimeter 24 and container rim 6 and lid rim 11 will be crimped into place. It can be seen that when the rubber-like material is tightly crimped between container rim 6 and lid rim 11, it will form an air-tight seal for retaining and sealing in the contents of container 1.

Figure 13:
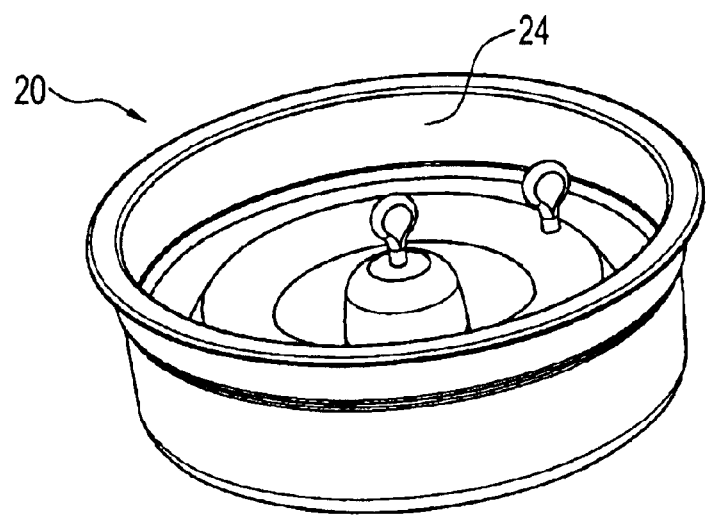
FIG. 13 is a perspective view of the nipple attachment in its folded position.
Figure 14:
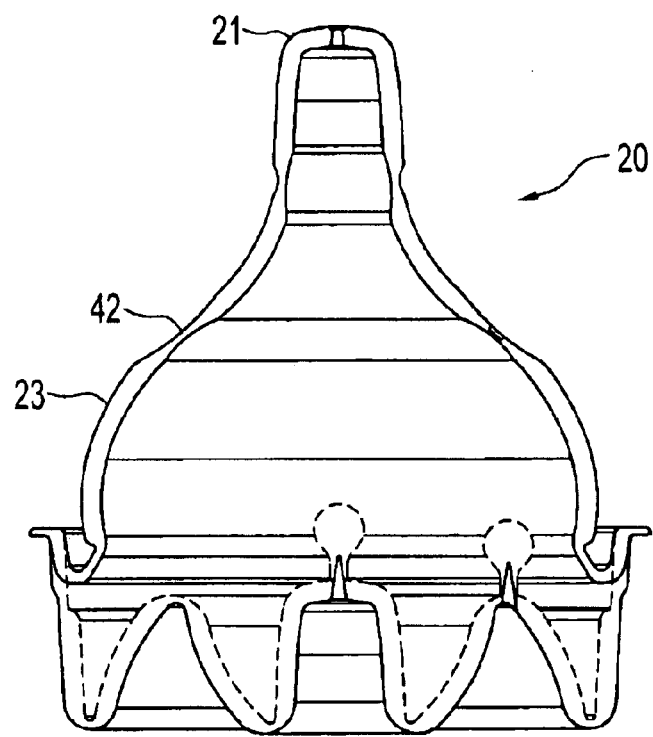
FIG. 14 is a view of the nipple attachment in its folded position, superimposed on a view of the nipple attachment in its extended position.

Returning to FIG. 1, nipple attachment 20 is shown in an extended position, ready for use as soon as the plugs 25 are removed. However, prior to being placed in use, nipple attachment 25 will be placed in a folded or semi-inverted position within can body 3 as seen in FIG. 3. The material between nipple neck 22 and nipple should 23 will be semi-inverted such that nipple head 21 will be just below lid 10. A perspective view of nipple attachment 20 in the folded position is seen in FIG. 13. In order to allow nipple attachment 20 to fold more readily, the side walls along the portion 42 (see FIGS. 10 and 14) which semi-inverts will be somewhat thinner than the remaining sections of nipple attachment 20. For example, this inverting portion 42 of the sidewall may be approximately 0.6 mm thick while the remaining sections of nipple attachment 20 is approximately 2 to 3 mm thick.

It will be seen that placing nipple attachment 20 in the folded position within container body 3 allows it to be sealed therein by lid 10 as suggested by FIGS. 3, 7 and 8. This will ensure that nipple attachment 20 remains in a clean and sterile condition up until the moment it is placed in use. To place container 1 into use, it is only necessary to remove the peel-back top 12 of lid 11, pull nipple attachment 20 into the extended position, and twist off removable plugs 25.

To manufacture container 1, standard canning techniques may be used to form container body 3, and if container 1 is to be the self-heating/cooling type, a cavity 30 as seen in FIG. 3 is also formed in container body 3. The container will be washed and sterilized by any conventional method such as high temperature steam, radiation, or other suitable means. Thereafter, the container will be filled with a food or beverage. Nipple attachment 20 is placed over the open end of container body 3 with the attachment perimeter 24 over lapping container rim 6 and nipple attachment 20 being in the semi-inverted position. Lid 10 is then placed over container rim 6 and crimped thereon. If the contents of the can so require, the entire enclosed can may then be sterilize. Then a plastic protective ring is placed upon rim 11 of lid 10. If container 1 is to be of the self-heating/cooling type, a thermic module is either separately inserted into or integrally formed within cavity 30. An insulating sleeve is wrapped around the container 1 and a plastic shrink-wrap labeling cover is placed around said insulating sleeve.

There are many advantages which flow from the present invention adapting a nipple attachment on standard sized soda containers. One advantage is that the method of manufacture will use current canning equipment to attach the nipple and easy-open-end. Additionally, the entire can and nipple combination may be readily handled and sterilized using existing manufacturing techniques and the canning process need not be altered. Furthermore, the cans occupy the same shelf space as current beverage cans, and can be dispensed via current vending machines. A further advantage is that nursing mothers do not need to mix or heat (if a thermic module is present) baby formulas. The ready to use, self-contained can may be opened and the thermic module activated at bed side, in cars, on planes, in rural places where local water may not be of adequate quality or cannot be sterilized. A further advantage is that the nipple attachment may be readily constructed for feeding juvenile children and is not limited to only infants. This conversion only requires that the nipples be formed with larger apertures to accommodate a larger liquid flow. Moreover, wherever this disclosure discusses infant bottles or nipples, it will be understood that this includes the same for juveniles.

A further advantage is that a singular universal can body can be used for both infant hot drinks requiring a temperature of only about 40° C. and adult hot drinks requiring a temperature of about 60° C. After canning, the appropriate thermic insert module (infant or adult) may be installed to achieve the correct temperature. A further advantage is that the nipple can be sealed onto the can body using the easy-open-end with out the necessity of additional gluing or crimping, plastic welding etc. This is a particular advantage in the manufacturing process. A further advantage is that fewer parts and processes are required then prior art baby bottles.

While the present invention has been described in terms of specific embodiments, many variations and modifications will be apparent to those skilled in the art. For example, the nipple attachment aspect of the present invention is intended to be used in conjunction with both cans having and cans not having thermic inserts. All such modifications and variations are intended to come within the scope of the following claims.

I claim:
1. A container for nursing infants comprising:
  a. a container having an interior and a first end with an opening into said interior;
  b. a flexible nipple attached across said opening and positioned such that at least a portion of said nipple extends into said interior of said container;
    i. wherein said nipple has a head section, a neck section, and a shoulder section and said head section has a nursing aperture with a removable plug positioned therein;
    ii. wherein said nipple further has an air aperture with a removable plug positioned therein; and
  c. a container lid positioned over said flexible nipple and enclosing said interior of said container.

2. The container according to claim 1, wherein said air aperture is formed in said shoulder section and removable plug is formed on a fault point in said shoulder section and a pull tab is attached to said removable plug.

3. The container according to claim 1, wherein said container opening has a rim and said flexible nipple has an attachment perimeter which extends over said rim and said lid crimps said attachment perimeter to said rim.

4. The container according to claim 3, wherein said lid is a peel-back opening type.

5. The container according to claim 1, wherein said container has a second end with internal walls extending upwards into toward said first end, thereby forming an internal cavity in said container.

6. The container according to claim 5, wherein said internal cavity contains a thermic module.

7. The container according to claim 6, wherein said thermic module includes a separate cup with a base and two compartments formed within said cup.

8. The container according to claim 6, wherein said thermic module heats the contents of said container between approximately 21° C. and 55° C.

9. The container according to claim 1, wherein said flexible nipple includes a thinned sidewall section to aid in inverting said nipple.

10. The container according to claim 1, further including an insulating sleeve comprising cotton or wool.

11. The container according to claim 1, wherein said container is constructed of the metal or plastic.

12. A container for nursing infants comprising:

a. a container having an interior and a first end with an opening into said interior;

b. a rim formed around said opening and a polymer protector ring positioned over said rim;

c. a flexible nipple having an attachment perimeter which extends over said rim such that at least a portion of said nipple extends into said interior of said container;

d. a container lid crimped over said attachment perimeter and enclosing said interior of said container.

* * * * *